Oct. 13, 1936.   D. R. McNEAL   2,057,498
STRAINING OR SEPARATING EQUIPMENT
Filed Sept. 26, 1934   3 Sheets-Sheet 3

Patented Oct. 13, 1936

2,057,498

UNITED STATES PATENT OFFICE 2,057,498

STRAINING OR SEPARATING EQUIPMENT

Daniel Raymond McNeal, Abington, Pa., assignor to Andale Company, Philadelphia, Pa., a corporation of Pennsylvania Application September 26, 1934, Serial No. 745,514

2 Claims. (Cl. 210—152)

This invention relates to straining or separating equipment and is particularly adapted for use in connection with what is known in the art as a "rotary strainer". In a preferred form of such a strainer, the equipment includes a casing and a rotor, the former having inlet and outlet openings for the fluid to be strained and the latter comprising a spoked wheel carrying the strainer elements proper which are divided (by means of the spokes) into a plurality of segments. In the operation of a device of this type the straining is preferably carried on continuously and means are provided for cleaning one or more of the strainer segments while another or other strainer segments are being employed for straining. As will appear more fully hereinafter, it is important, especially where relatively high pressures are encountered, that leakage from one strainer segment to another be avoided.

This invention is especially concerned with the problem mentioned above and in one of its broader aspects provides means for virtually eliminating leakage from one strainer segment to another. Complementarily to this, the invention contemplates a novel method of manufacturing certain of the strainer parts to accomplish the purpose already mentioned.

The invention, therefore, has in view, as a more or less general object, increasing the efficiency and effectiveness of straining or separating equipment, especially of a rotary strainer.

How the foregoing, together with other objects and advantages are attained, will be pointed out more specifically in the following description referring to the accompanying drawings, in which—

Figure 1:
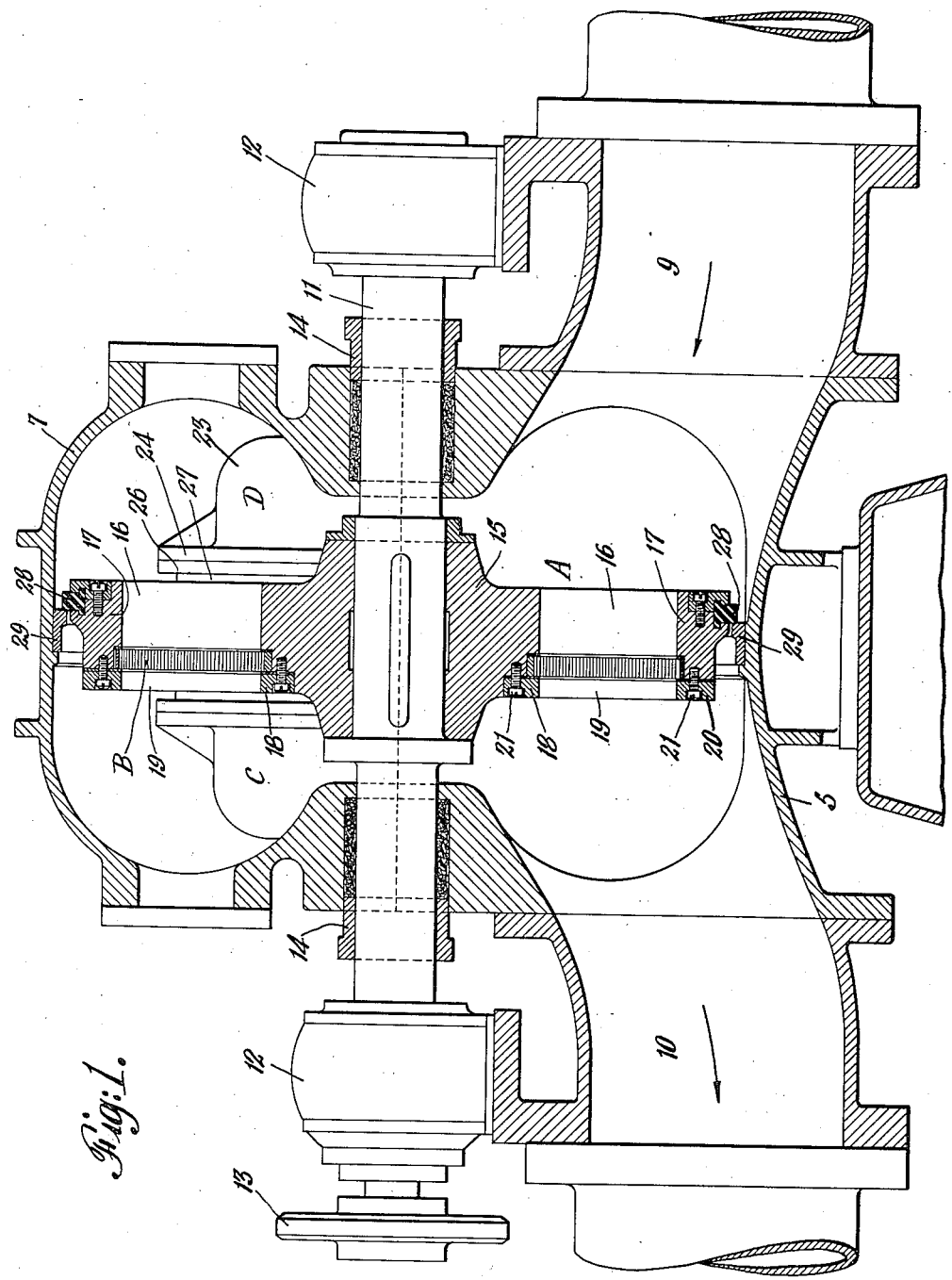
Figure 1 is a transverse vertical sectional view through a rotary strainer incorporating the improvements of this invention.
Figure 2:
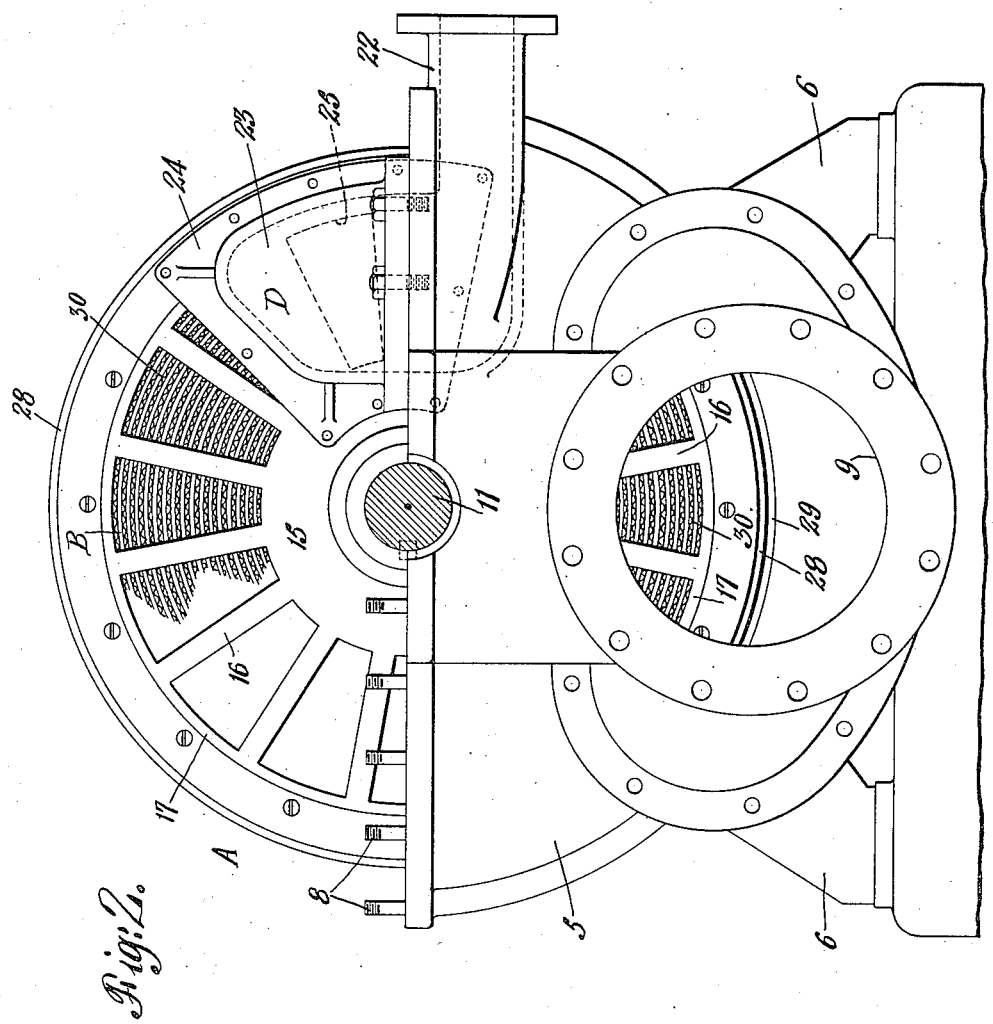
Figure 2 is a side view of the equipment taken from the right of Figure 1, with a portion of the strainer casing removed.

Referring first to Figures 1 and 2, a strainer casing member is designated by the numeral 5, in the particular embodiment illustrated this member constituting the base of the equipment which may be mounted in any convenient fashion as by the feet 6 (see Fig. 2). The strainer casing is completed by an upper member 7 which cooperates with member 5. Studs 8 may be employed to secure the two casing members together. Many features of the configuration and structure of these members (5 and 7) need not be considered in detail herein since they form no part of the present invention per se but are described and claimed in my copending application Serial No. 657,586, filed February 20th, 1933. It should be noted, however, that the two halves of the strainer casing cooperate to provide a generally annular chamber or cavity having an inlet 9 at one side and an outlet 10 at the opposite side. The strainer rotor generally identified by the letter A is mounted within the casing by means of shaft 11 which may conveniently be journalled as at 12—12 and provided with any suitable driving means 13. At the points where the shaft passes through the casing wall, packing glands or the like 14 may be employed.

The strainer rotor includes a hub 15 keyed to or splined with shaft 11, a plurality of spokes 16, and a peripheral ring 17. The rotor also carries another spoked member having a central ring 18, spokes 19, and peripheral ring 20. This member is secured to the main part of the rotor as by studs 21, and each pair of spokes 16 and 19 of the two members are arranged to lie in the same radial plane.

Figure 3:
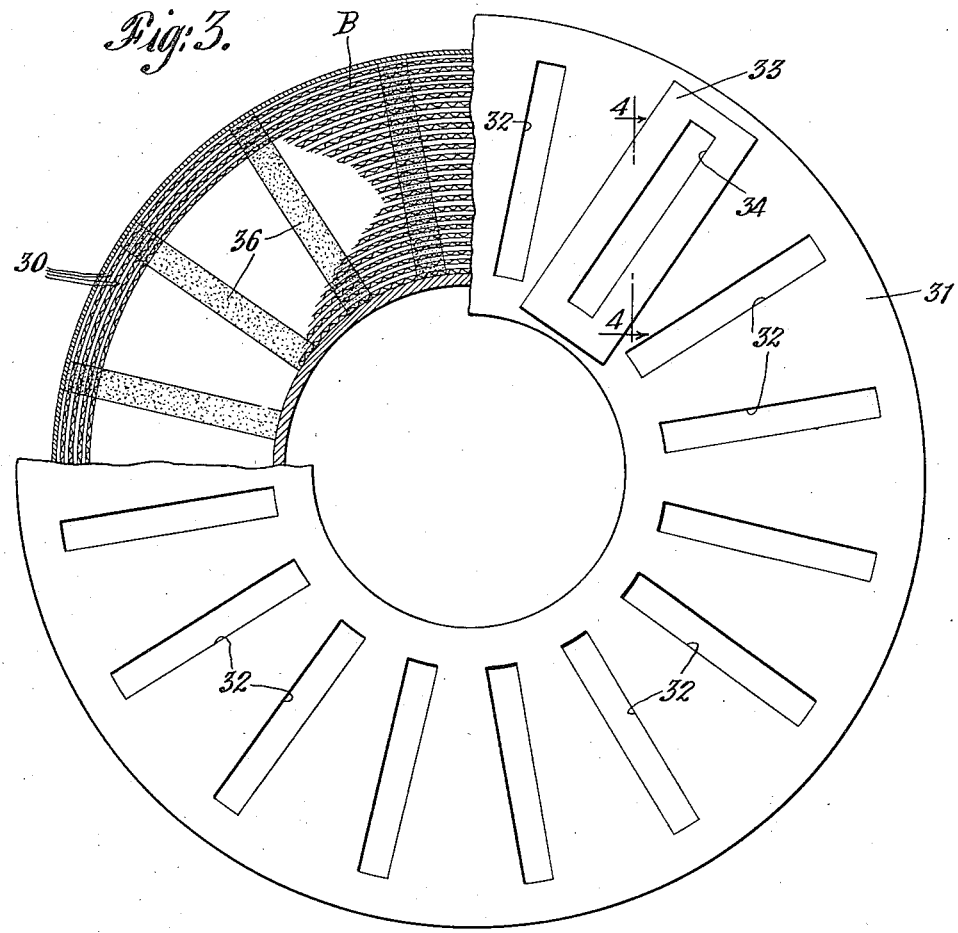
Figure 3 is a plan view of one of the strainer elements together with certain devices which may be employed in following the method of this invention.

The two rotor parts just described are also formed to receive a strainer member or device identified generally by the letter B which takes the form of an annular member, as will be apparent from inspection of Figures 1, 2 and 3. In operation, of course, the fluid entering through inlet 9 passes into the annular chamber formed in the casing at the right-hand side of the rotor as viewed in Figure 1, and then passes through the portions of the strainer B which are exposed in the segments or segmental pockets defined by spokes 16. The strained fluid, of course, passes out through the outlet 10.

As briefly mentioned hereinbefore, equipment of this type is provided with a mechanism for cleaning one or more strainer segments or pockets without interrupting or interfering with the straining function of the remainder. This may be accomplished by means of the type more fully illustrated and described in my copending application referred to above. In general, this equipment includes inlet and outlet "cleaning boxes" C and D. These boxes may be fixedly mounted within the strainer casing, and the box C is provided with a connection for supply of a cleaning medium or fluid. Box D, on the other hand, is provided with a connection 22 for carrying away the cleaning fluid after it has passed through the strainer, together with the material, dirt, or debris which is being cleaned or removed from the strainer. The two boxes are similarly though complementarily formed, in view of which reference need only be made to one of them. As seen in Figures 1 and 2, box D incorporates a bulbular casing 23 which is open on its side toward the rotor and provided around its margins with a flange 24 lying in a plane paralleling the plane of the strainer rotor. Between the flange 24 and the adjacent face of the strainer rotor an additional member 26, carrying a rubber or resilient facing 27, is interposed, the member 26 and facing 27 both having registering apertures which may be of the shape and size indicated by the dotted line showing 25 (see Fig. 2).

The rubber facing 26 serves as a seal device in the manner more fully described in the aforementioned copending application, and when a strainer pocket or segment comes into registry with aperture 25, cleaning fluid passes from the inlet cleaning box C through the strainer B and thence into box D to be discharged through connection 22. It is of importance, of course, that the individual strainer segments which are being cleaned be closed off as completely as possible from the chamber in which straining is taking place. This is especially true where the fluid being strained, i. e. the fluid passing into the casing at 9 and out at 10, is under relatively high pressure, for the reason that a serious loss of fluid or pressure would result were there any appreciable leakage from the straining chamber itself into the cleaning boxes.

With regard to the general structure of the strainer, it is further mentioned that a resilient ring 28 is extended around the strainer rotor and positioned to cooperate with a ring 29 carried in the casing, so as to prevent leakage of fluid from the inlet side of the strainer to the outlet side in the manner claimed and more fully described in my copending application Serial No. 721,447, filed April 20th, 1934.

Turning now to the strainer member B, as seen to best advantage in Figure 3, this member is of annular form and is preferably composed of a plurality of strips 30, arranged about a center point, some of these strips being corrugated, if desired, so as to form the perforations of the strainer. This annulus or strainer ring may conveniently be produced by spirally winding a flat strip and a corrugated strip (or a plurality of both), so as to provide a multiplicity of layers between which, of course, the perforations are formed.

A difficulty heretofore encountered with a strainer disk formed in this way was that leakage occurred from portions of the strainer exposed in segments adjacent to a segment being cleaned, the leakage being from such adjacent segments to the one being cleaned. More specifically, the leakage took place between the strips of which the strainer disk is composed, in a direction around the disk between the pairs of spokes 16—19 of the rotor.

The foregoing difficulty has been overcome in accordance with the present invention by providing the strainer disk B with a plurality of spokes which infill the strainer perforations in zones substantially corresponding in configuration and spacing with the spokes 16 and 19 of the rotor. Therefore, although the straining elements which are exposed in all segments or pockets of the rotor are formed by employing an annular shaped strainer member, the spokes of the rotor are substantially continuous or solid throughout the entire thickness or width of the rotor. Each spoke is thus composed of a spoke element 16, a spoke formed within the disk B, and a spoke element 19.

Figure 4:
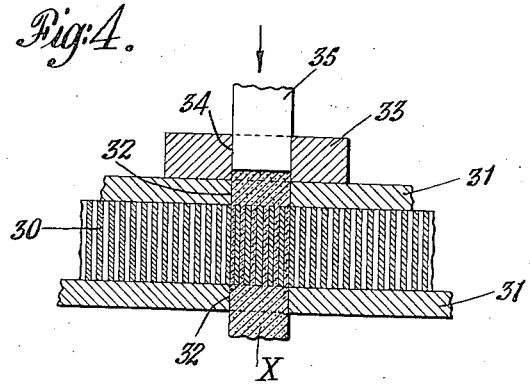
Figure 4 is a fragmentary view taken substantially as indicated by the section line 4—4 in Figure 3.

As hereinbefore mentioned, the preferred manner of producing the strainer member B is to wind alternate flat and corrugated strips to form an annular shape such as indicated in Figure 3. This annulus is then placed between a pair of templet members 31 at least the upper one of which has slots 32 formed therein in a pattern conforming with the spokes of the strainer rotor. An additional member 33 having slot 34 therein may then be placed over one of slots 32 in one of the members 31. By introducing plastic material such as indicated at X in Figure 4, into slot 34 of member 33, and by forcing a plunger 35 down into this slot, the plastic material may be forced into the perforations or spaces of the strainer 30 to substantially completely infill such spaces within the zones corresponding with the rotor spokes. The material employed preferably is of the type which will harden or set upon cooling, such, for example, as bakelite, rubber compounds of various types, and the like. After all of the desired spokes have been molded within the strainer, the several templet members are removed and any excess molding material, preferably after it has hardened, is removed from opposite sides of the strainer disk. In this way a strainer member is produced in which the perforations of certain zones are filled with a material to divide the strainer into a plurality of sections. Several of the molded spokes appear at 36 in Figure 3.

When assembled in the strainer rotor in the manner hereinbefore described in connection with Figures 1 and 2, the molded spokes cooperate with spokes 16 and 19 to prevent leakage or loss of pressure by flow of fluid from one strainer pocket to an adjacent one. It will be understood that it is not essential that the width of the molded spokes be equal to that of the spokes 16 and 19, the important thing being to provide a partition or spoke within the strainer itself registering with spokes 16 and 19.

It will further be understood that the particular manner and means discussed above for molding the spokes might be modified extensively without departing from the spirit of the invention.

I claim:—

1. As an article of manufacture, a rotary strainer member composed of a plurality of strips spirally wound about the center of the member and providing the strainer perforations therebetween, and material molded within and infilling said perforations in a region or zone extended generally radially of the member.

2. As an article of manufacture, a rotary strainer member composed of a plurality of straining strips curved around the center of the member in side-by-side relationship and formed to provide a multiplicity of strainer perforations therebetween, and material molded within and infilling said perforations in a series of generally radially disposed regions or zones so as to provide a plurality of separated straining areas.

DANIEL RAYMOND McNEAL.